Figure 1:
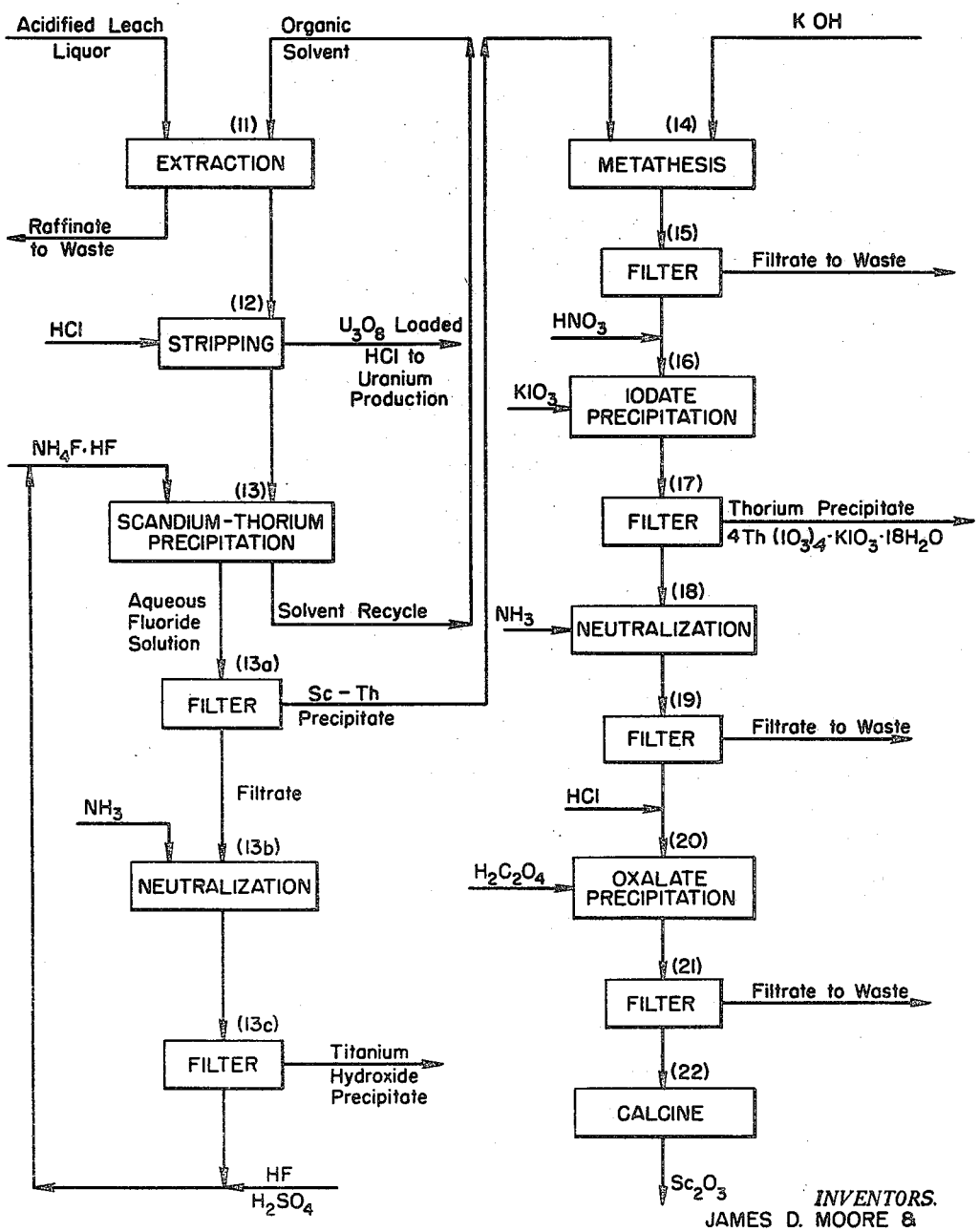

United States Patent Office 3,146,063
Patented Aug. 25, 1964

3,146,063
PROCESS FOR SEPARATING SCANDIUM FROM MIXTURES CONTAINING SCANDIUM AND THORIUM VALUES
James D. Moore and Norman N. Schiff, Salt Lake City, Utah, assignors to Vitro Corporation of America, New York, N.Y.
Filed Jan. 3, 1961, Ser. No. 80,260
4 Claims. (Cl. 23—14.5)

This invention relates to a process for recovering scandium from mixtures with other metals, more particularly with recovering scandium from mixtures of scandium and thorium.

Scandium is a valuable and rare metal which generally occurs in ores in such a low concentration that it is very difficult to isolate and purify.

Accordingly, one object of the invention is to provide a source and method for producing scandium substantially isolated from other metals.

Another object of the invention is to separate scandium from thorium, a metal with which it is frequently associated.

Other objects and advantages of the invention will appear from the description.

It has been found according to the present invention that scandium occurs in small amounts in certain uranium ores which are processed for the production of uranium, thorium and titanium. The uranium ores pitchblende, autunite, uraninite, and coffinite are produced in various mining districts throughout Utah, Colorado, Nevada, Wyoming, Idaho, New Mexico, Arizona, and Canada and to a lesser extent from other fringe areas. Such ores are usually crushed and then fine ground to approximately below 20 mesh in either ball mills or rod mills in closed circuit with appropriate classification equipment. The ground ore in water slurry is then fed to a series of agitator leach tanks where sulfuric acid is added to solubilize the uranium. Various conditions such as residence time, acid concentration, oxidation state and elevated temperatures are maintained depending upon the amenability characteristics of the ore being processed. Following the leaching step, the slurry may be de-watered by any of the commonly known processes such as filtration or decantation to produce a "pregnant" solution containing the desired uranium. Depending upon the uranium concentration in the ores treated and the amount of wash water used, the uranium concentration of pregnant liquor may vary from about 0.5 to 2.0 grams per liter of $U_3O_8$.

The acidified leach liquor produced by the method described has been treated by an extraction process with an organic solvent. The organic solvent used can be the commonly known organo phosphates in a hydrocarbon diluent such as kerosene. Di-2-ethylhexyl phosphoric acid, or heptadecyl phosphoric acid or dodecyl phosphoric acid may be used. However, a preferred organic solvent is 3% by volume solution of dodecyl phosphoric acid in kerosene diluent.

The spent aqueous phase is discarded and the organic phase, now containing the mineral values, is routed to a second extraction operation wherein the mineral values are removed by extraction with strong mineral acid, such as hydrochloric acid. This removes uranium from the organic solvent and the acid solution is directed to further processing for the production of uranium concentrates.

The organic solvent previously stripped with aqueous hydrochloric acid, which is now substantially devoid of uranium but which still contains thorium, has then been extracted with acidified ammonium bifluoride solution ($NH_4F \cdot HF$) to precipitate and remove the thorium so as to permit recycling of the organic solvent to the first extraction operation previously described. Other mineral acid solutions of a fluoride salt may be used with the proper amount of free fluoride. The insoluble thorium fluoride is removed by filtration while the soluble titanium ion remains in solution.

According to the present invention, it has been discovered that substantial and recoverable amounts of scandium may be produced in the thorium fluoride precipitate by selecting a uranium ore containing even trace amounts of scandium and treating such ore by the procedure described above.

The scandium-thorium fluoride precipitate normally contains from about 5 to about 20% scandium and from about 10 to about 40% thorium on a dry weight basis. Of course, these values will vary depending upon the particular ore used in the leaching operation. The scandium-thorium fluoride precipitate is agitated in the presence of a strong solution of an alkali metal hydroxide, such as potassium hydroxide (six normal), at a temperature and for a time sufficient to convert the fluoride to the insoluble hydroxides. With six normal potassium hydroxide, heating at 70° to 90° C. for about four hours generally completes the replacement of fluoride with hydroxyl ions. The insoluble hydroxides are then filtered and the fluoride is removed as potassium fluoride in the filtrate. The alkali solubilizes those metals that form amphoteric hydroxides and those that form soluble fluoride complexes in an alkaline solution. These impurities are removed with the filtrate.

The precipitate is dissolved in a strong acid such as nitric acid (three normal). Presumably any mineral acid in all concentration ranges can be used, however, we believe that 3 N $HNO_3$ is optimum. A sufficient excess of acid is used to insure that the solution has a three normal concentration of nitric acid. An alkali metal or ammonium iodate such as potassium iodate ($KIO_3$) is then added to effect the formation of a complex and the precipitation of the thorium as a complex thorium alkali metal iodate, e.g., $4Th(IO_3)_4 \cdot KIO_3 \cdot 18H_2O$. Preferably an excess of a saturated solution of potassium iodate is used which has been made slightly acidic with nitric acid. Potassium iodate is added to the nitric acid solution in a 50% excess of that amount theoretically required to precipitate the complex. Thus, a 50% excess would require about 6.4 moles of potassium iodate for each mole of thorium present. The use of potassium iodate in its solid form is undesirable since the precipitate tends to form around the iodate crystals and an excessive amount of reagent is consumed. For maximum efficiency, a saturated solution of potassium iodate is used. In order to maintain the acid concentration of the solution containing soluble scandium and thorium, enough nitric acid is added to the saturated iodate solution to insure a total nitric acid concentration of three normal in the final solution. This phase of the process is preferably carried out at about room temperature. The insoluble thorium iodate complex is removed by filtration. The reaction described above evidently takes place between the iodate ion and the metallic (alkali metal and thorium) ions to produce the complex metallic iodate. Nitric acid is the preferred reagent but other acids may be utilized. The use of hydrochloric acid is to be avoided however, since reactions may occur between the acid and the iodate. Since thorium sulphate is somewhat insoluble under certain conditions, the use of sulphuric acid is also undesirable. It should be realized that the solution of the hydroxide precipitate by other acids requires an excess of reagents and usually produces less than optimum results. It is apparent moreover, that the process described may be used in separating scandium from thorium derived from other sources.

After the thorium iodate has been precipitated and removed, the filtrate is neutralized with an excess of ammonia preferably in the presence of excess ammonium chloride to precipitate insoluble hydroxides, consisting mainly of scandium hydroxides and small amounts of impurities. The ammonium chloride is an optional reagent and is added prior to precipitation to increase the solubility of the alkali and alkaline earth metal impurities present. To obtain complete precipitation of the hydroxides, an excess of ammonia is used. The pH of the filtrate should be at least six and not more than about nine. Practically speaking, a pH of seven to eight will suffice to insure essentially complete precipitation. The hydroxide precipitates are recovered by filtration while the filtrate is discarded.

The hydroxide precipitate is dissolved in strong mineral acid such as hydrochloric acid (1.5 normal) preferably at an elevated temperature in the approximate range of 70° to 90° C. Presumably any concentration can be used, however, we believe 1.5 N HCl is optimum. Other acids may be used to dissolve the scandium hydroxide but hydrochloric acid is preferred since the oxalate precipitation is more complete if carried out in a hydrochloric acid solution. Sufficient acid should be added to dissolve the hydroxide and produce a 1.5 normal hydrochloric acid solution. Scandium is precipitated from the solution by adding oxalic acid. The solution is boiled to complete the precipitation. Preferably, an excess of oxalic acid, e.g., 100% excess of the stoichiometric quantity is used to decompose any small remaining amounts of potassium iodate. More complete precipitation can be obtained by allowing the solution to stand for several hours, for example, up to about eight hours.

The precipitated scandium oxalate is recovered by filtration and the precipitate is calcined to the oxide by heating in a furnace in an oxidizing atmosphere at a temperature high enough and for a time sufficient to bring about substantially complete oxidation of the organic matter. Heating at a temperature of 800° C. for about one hour is satisfactory.

Although the procedure has been described in connection with the recovery of scandium from uranium ores, and the isolation of a mixture of scandium and thorium produced from such ores, it will be apparent that the principle of the invention may be applied to the separation and recovery of scandium from scandium-thorium mixtures derived from other sources. Following is an example of a procedure for carrying out the process of the present invention using materials derived from the refining of uranium ores.

FIGURE 1 is a schematic diagram illustrating the sequence of operating steps carried out in the example.

The parts expressed are by weight unless otherwise indicated.

An acidified leach liquor obtained by the treatment of uranium ore having a pH of about 1.0, said leach liquor containing from 0.5 to 2.0 grams per liter of $U_3O_8$ and on the order of about 0.001 gram per liter of scandium, about 0.002 gram per liter of thorium and trace amounts of titanium are treated in a stagewise countercurrent (four stages) operation at 11 with a 3% by volume solution of dodecyl phosphoric acid in kerosene diluent. The spent aqueous phase is discarded while the organic phase, which now contains the desired mineral values, is routed to a second extraction operation 12 where the values are removed by a stagewise (five stages) and countercurrent treatment with strong hydrochloric acid. This removes the uranium from the organic solvent and the acid solution is directed to further processing for the production of uranium concentrates.

The organic solvent is then charged to a conventional mixer settler extraction unit 13, where it is treated in a countercurrent stagewise process (two stages) with acidified ammonium bifluoride solution at a volume ratio of organic to aqueous phases of 10 to 1. The stripped solvent is recycled to the first extraction operation for further recovery of values from the aqueous acid feed solution. The aqueous solution used contains 5% fluoride ion as $NH_4F \cdot HF$ with a pH adjusted to 5.0 with sulfuric acid. The insoluble fluorides of scandium and thorium are removed by filtration at 13a. The filtrate is adjusted to a pH of 8.0 with ammonia or ammonium hydroxide at 13b and insoluble titanium hydroxide precipitates, which is removed by filtration at 13c. The filtrate is fortified by the addition of hydrofluoric acid to 5% free fluoride ion concentration and is acidified with sulfuric acid back to a pH of 5.0. This solution is then available for recycle and recovery of additional values.

The insoluble scandium-thorium fluoride from 13a is agitated with a solution of six normal potassium hydroxide at 14 for four hours at a temperature within the range of 70° to 90° C., thus completing the replacement of the fluoride with hydroxyl groups. The insoluble hydroxides are filtered at 15 and the filtrate containing soluble fluorides is withdrawn. To the precipitate is added sufficient three normal nitric acid to completely dissolve the hydroxides and give a solution having a three normal nitric acid concentration. A 50% excess of a saturated potassium iodate solution containing sufficient nitric acid to maintain the acid concentration of the solution is thereupon added at 16 to precipitate the complex thorium iodate, $4Th(IO_3)_4 \cdot KIO_3 \cdot 18H_2O$. It should be obvious that the amount of potassium iodate reagent added depends upon the concentration of thorium in the acidic leach liquor. A ratio of about 6.4 moles of potassium iodate per mole of thorium should suffice to complete the precipitation. The treatment and precipitation are carried out at room temperature and the insoluble thorium iodate complex is removed by filtration at 17.

The filtrate containing the desired scandium ion is neutralized with ammonia to a pH of 8.0 at 18, excess ammonium chloride having been added previously to increase the solubility of the alkali and alkaline earth ions. The hydroxide precipitates, including scandium hydroxide, are recovered by filtration at 19, and the filtrate is discarded. The precipitate is dissolved in 1.5 normal hydrochloric acid at an elevated temperature on the order of 70° to 90° C., sufficient acid being added to yield a solution having a 1.5 normal hydrochloric acid concentration. One hundred percent (100%) stoichiometric excess (based on formation of scandium oxalate) of oxalic acid is then added at 20 and the solution is boiled to complete the precipitation of scandium oxalate. The solution thereafter is allowed to stand for eight hours to effect precipitation of the maximum amount of scandium oxalate. The precipitate is filtered at 21 and calcined in a muffle furnace 22 at a temperature of 800° C. for one hour. The recovery of scandium oxide based on the content of the original acid leach liquor is about 85%. Analysis of the product showed it to be over 99% pure $Sc_2O_3$. It should be obvious that particular steps in the purification procedure may be repeated to further purify the product.

Although specific and preferred embodiments of the invention have been described herein, we intend that all modifications and equivalents thereof be included within the scope of the appended claims.

We claim:

1. The process for separating scandium from a mixture of scandium and thorium, which comprises precipitating the thorium as the insoluble iodate from a mineral acid solution containing ions of scandium and thorium by adding a soluble iodate ion in aqueous solution, said mineral acid being free of ions which would prevent the iodate precipitaion, separating the precipitate from the liquid, adding an aqueous solution of ammonia as a source of hydroxide ions to said liquid to produce a solution having a pH of about 6 to about 9 to precipitate selectively the scandium as scandium hydroxide and to increase the solubility of any alkali and alkaline earth metal ions present, and removing the scandium hydroxide.

2. A process for separating scandium from a mixture of scandium fluoride and thorium fluoride which comprises treating said mixture with a strong aqueous solution of potassium hydroxide thereby to convert the scandium and thorium to their hydroxides, removing the insoluble hydroxides from the solution, treating said insoluble hydroxides with nitric acid and potassium iodate thereby to convert substantially all of the thorium to an insoluble thorium-potassium iodate complex while retaining substantially all of the scandium ions in solution, removing the said insoluble complex from the solution, adding ammonia and ammonium chloride to said last named solution to produce a solution having a pH of about 6 to about 9 and to substantially neutralize the same and cause substantially complete precipitation of scandium hydroxide while retaining most of the impurities in solution, removing the scandium hydroxide from the solution, forming a solution of said scandium hydroxide by treatment with a strong mineral acid, treating said scandium ions in an aqueous solution with oxalic acid thereby to precipitate scandium oxalate from the solution, and removing said precipitate from the solution.

3. A process for recovering scandium from a uranium ore containing thorium, titanium, at least a trace amount of scandium and other impurities, which comprises treating acid leach liquor from the acid leach of crushed ore with an organic solvent capable of extracting uranium, thorium, titanium, and scandium ions from said acid leach liquor, stripping said organic solvent with an aqueous mineral acid solution thereby selectively to extract uranium ions therefrom, treating the stripped organic solvent with an aqueous acid solution of a fluoride thereby to precipitate selectively scandium fluoride and thorium fluoride with some impurities, retaining a major amount of titanium ions in solution, separating the precipitated scandium fluoride and thorium fluoride from the liquid, treating the scandium fluoride and thorium fluoride and impurities with a strong aqueous alkali metal hydroxide solution thereby to convert most of the scandium fluoride and thorium fluoride to scandium hydroxide and thorium hydroxide and most of the impurities to soluble ions, separating the insoluble scandium hydroxide and thorium hydroxide from the liquid containing impurities, dissolving said scandium hydroxide and thorium hydroxide in nitric acid and treating said solution with potassium iodate thereby to convert the thorium to an insoluble complex of thorium-potassium iodate retaining most of the other components in solution, separating said insoluble complex from the liquid, treating the latter liquid with ammonium chloride and free ammonia to produce a solution having a pH of about 6 to about 9 and thereby to precipitate selectively the scandium as scandium hydroxide retaining most of the impurities in solution, separating said scandium hydroxide from said solution, treating said scandium hydroxide with a strong mineral acid to dissolve the scandium ions, treating said scandium ions in aqueous solution with oxalic acid thereby to precipitate selectively scandium oxalate retaining most of the remaining impurities in solution, separating said scandium oxalate from said last-mentioned solution, and calcining said scandium oxalate in an oxidizing atmosphere thereby to convert it to scandium oxide.

4. A process for recovering scandium from ores containing scandium and thorium, which comprises treating acid leach liquor from the acid leach of crushed ore with an organo-phosphate solvent to extract the scandium and thorium ions, treating the organo-phosphate solvent with a mineral acid to extract any metal cations soluble in said mineral acid, adding an acid solution of a fluoride to the stripped organic solvent to precipitate scandium fluoride and thorium fluoride, converting the mixture of scandium and thorium fluorides to an acid-soluble precipitate by adding an alkali metal hydroxide and dissolving the precipitate in a mineral acid capable of dissolving said precipitate and free of ions which would prevent iodate precipitation, precipitating the thorium by adding soluble iodate ion to the acid solution, neutralizing the solution containing scandium ion to a pH of about 6 to about 9 to precipitate scandium hydroxide, and calcining the scandium hydroxide to produce scandium oxide.

References Cited in the file of this patent

NSA 1: 4057 (Nuclear Science Abstracts, vol. 7, Abstract No. 4057), 1953.

Nuclear Science Abstracts, vol. 14, abstract No. 268, January 15, 1960 abstracting "Separation of Scandium From the Rare Earths and Zirconium," Moskalkavs et al., Trudy Radievogo Inst. im V.G. Khlopina 7, 141–3 (1957).